United States Patent
Shikada

[11] 3,772,059
[45] Nov. 13, 1973

[54] METHOD FOR PRODUCING MICROPOROUS SHEET MATERIAL

[75] Inventor: Tatsunori Shikada, Osaka, Japan

[73] Assignee: Kanegafuchi Boseki Kabushiki Kaisha, Tokyo, Japan

[22] Filed: Apr. 5, 1971

[21] Appl. No.: 130,965

[30] Foreign Application Priority Data
Apr. 13, 1970 Japan................... 45/31388

[52] U.S. Cl........... 117/63, 117/135.5, 117/161 KP, 117/11, 260/205 AY, 264/49, 161/159
[51] Int. Cl. ....... B44d 1/44, B32b 5/18, D06n 3/00
[58] Field of Search................. 260/2.5 AY; 117/63, 117/135.5, 161 KP; 264/49; 260/2.5 AY; 161/159

[56] References Cited
UNITED STATES PATENTS

| | | | |
|---|---|---|---|
| 3,582,393 | 6/1971 | Skikada | 117/63 |
| 3,595,685 | 7/1971 | Maeda et al. | 117/63 |
| 3,275,468 | 9/1966 | Aoki | 117/135.5 |
| 3,387,989 | 6/1968 | West | 264/49 |
| 3,524,753 | 8/1970 | Sharp | 117/11 |
| 3,483,015 | 12/1969 | Fukashima et al. | 117/135.5 |
| 3,486,968 | 12/1969 | Mater | 117/135.5 |
| 3,284,274 | 11/1966 | Hulsander et al. | 117/135.5 |
| 3,000,757 | 9/1961 | Johnston et al. | 117/63 |
| 3,296,016 | 1/1967 | Murphy | 117/63 |

*Primary Examiner*—Murray Katz
*Assistant Examiner*—William R. Trenor
*Attorney*—Woodhams, Blanchard & Flynn

[57] ABSTRACT

A method for producing a microporous sheet material having excellent abrasion resistance and moisture-permeability useful for artificial leathers wherein numerous bead-like linked spherical micropores are arranged contiguously at barrier intervals in the interior of the microporous layer is proposed. A coating solution of a polymer predominantly comprising polyurethane elastomer containing an inorganic salt selected from among sodium chloride, sodium sulphate, potassium chloride and potassium sulphate and a higher aliphatic carboxylic acid selected from among stearic acid, palmitic acid and myristic acid is applied to a base sheet material, then coagulated in a coagulating bath comprising water or an aqueous solution of said inorganic salt, washed and dried. Thus-obtained microporous sheet may be further subjected to buffing or grinding to produce a suede-like sheet material, if required.

8 Claims, 2 Drawing Figures

INVENTOR
TATSUNORI SHIKADA

METHOD FOR PRODUCING MICROPOROUS SHEET MATERIAL

This invention relates to a novel and improved method for producing a microporous structure useful for artificial leather, more particularly, a microporous sheet material comprising predominantly a polyurethane elastomer which has deep color shade, light weight and excellent flexibility, abrasion resistance and moisture-permeability.

In order to obtain a flexible porous polymer sheet material which is light in the weight and is excellent in the moisture-permeability and softness, it is, in general, necessary to form, in the porous polymer layer, micropores particularly in a uniform state for imparting a moisture-permeability as well as comparatively large pores for the purpose of imparting softness and high porosity to the polymer sheet material.

In this respect, in Belgium Patent No. 636,018, there has been mentioned a process for producing a porous sheet material in which a honeycomb-like porous layer is formed by coating at least one surface of a fibrous sheet material with a polyurethane solution and coagulating the solution layer with non-solvent such as water so that large pores may be partitioned from each other by a wall having fine micro-pores.

However, in such process, as admitted in the patent specification, a strict control is necessary under various specified conditions such as the ratio of the solvent to the non-solvent. The viscosity of the coating solution, atmospheric humidity and temperature under which the formation of the film is conducted. Therefore, many difficulties are encountered in the industrial practice of said process. For example, in such process, if the surface layer of the film is exposed to a moisture until said layer coagulates before it is bathed in a non-solvent, the pores in the resulting porous layer will remain less than 20 microns in the diameter and various desirable properties due to the honeycomb-shaped layer will not be obtained. Further, in said patent specification, it is also mentioned that, in a certain example, the desirable room temperature during the coating operation with a polyurethane solution was 21°C and the desirable relative hymidity was 20 percent and that a higher humidity will cause faster coagulation and must be avoided in order to produce a desirable cellular structure. However, there are many difficulties in keeping such a strictly controlled atmospheric condition during the coating and coagulating steps in the actual industrial practice. Furthermore, there is mentioned in said patent specification that, in a certain embodiment of the production, the porous layer contains at least 50 percent by volume of conical pores, each of which diameter becomes larger from the top surface to the bottom surface of the layer. However, when a suede-like sheet is produced using a microporous sheet material having such a structure, the colour tone and hand or appearance vary depending upon the amount buffed off from the top surface so that a strict and troublesome control is also necessary in the actual industrial practice.

In a known wet-coagulating process wherein water is used as a coagulating agent, there are difficulties that the surface layer of the polyurethane solution coated will quickly coagulate in contact with water to form a compact structure so that the further penetration of water into the interior of the coated layer or film will be delayed. Thus a strain will be produced between said surface layer of the film wherein the coagulation is quick and the interior wherein the penetration of water is slow. Therefore, finally, local and nonuniform large pores will be likely to be formed in said interior, and as a whole the resulting sheet would have no desired moisture-permeability and softness.

Further, in British Patent Specification No. 1,122,804, a method of making an artificial leather has been proposed which comprises coating a substrate with liquid which consists of a solution of polyurethane resin in N,N'-dimethylformamide and 50 – 600 percent by weight, based on the polyurethane, of a water-soluble, inorganic salt particles homogeneously dispersed therein and bathing the coated substrate in water to regenerate the polyurethane film concurrently leaching out or removing the salt to form a microporous layer. However, thus-obtained microporous sheet is formed of so-called spongecake-like porous structure wherein innumerable spherical pores are arranged randomly from the surface to the interior of the layer, so that it is inferior in abrasion resistance and impact resistance. Therefore, when the porous sheet is further subjected to buffing to produce a suede-like material, it is rather difficult to regulate the buffing amount and to perform the smooth buffing operation. The above-mentioned porous sheet contains numerous honeycomb-like pores from the inner layer to the bottom layer, so that when a suede-like sheet material is formed by buffing the top of the porous layer, the colour tone of the resulting material may be changed or be dull or dead by random reflection of light owing to difference in porous structure between its top surface layer and bottom layer.

Furthermore, there has been heretofore known a method for producing a porous sheet which comprises coating a base material with polyurethane solution containing a higher aliphatic carboxylic acid, coagulating the coating matter in water and subsequently washing it with water and drying (British Patent No. 1,129,122). The microporous sheet obtained in accordance with the method, however, has a structure wherein numerous long crack-like pores arranged perpendicularly or obliquely to the surface of the microporous layer, are intercommunicated with each other throughout the top to the bottom. Accordingly, it is poor in impact resistance and abrasion resistance. Moreover the above cited method has such a drawback that when the amount of higher aliphatic carboxylic acid exceeds 30 percent by weight, the coagulation rate is too low and the moisture-permeability of the resulted product is inferior, and further when the said amount exceeds 50 percent by weight, non-porous film is formed or in the worst case, film is not formed.

The present invention has been accomplished to improve or solve the prior art defects or problems as mentioned above in the formation of a microporous sheet material, by employing as a coating solution a polymer solution predominantly comprising a polyurethane containing a specified amount of a mixture of a specified water-soluble inorganic salt and a specified higher aliphatic carboxylic acid, as mentioned hereinafter, and by coagulating the coated material in water or an aqueous solution of a specified inorganic salt same as above whereby a microporous sheet having a unique structure different from the above-mentioned known structures is formed due to a synergistic action of said inorganic salt and said higher aliphatic carboxylic acid and as a result, its abrasion resistance and moisture-permeability are remarkably improved cooperatively.

The primary object of the invention is to provide a method for producing a smooth leather-like or suede-like microporous sheet material which is excellent in abrasion resistance, impact resistance, moisture-permeability and color shade when colored.

The secondary object of the invention is to provide a method for producing an improved smooth leather-like or suede-like, microporous sheet material easily and advantageously on industrial scale.

Other objects of the invention will become apparent from the following description.

The objects of this invention are accomplished by: a method of producing a smooth leather-like microporous sheet material which comprises coating at least one surface of a fibrous base material or a plate for film making (substrate) with a mixture of solution of a polymer predominantly comprising a polyurethane in a water-miscible organic solvent, 100 to 500 percent by weight based on the weight of the polyurethane of particles of at least one inorganic salt selected from the group consisting of sodium sulphate, sodium chloride, potassium chloride and potassium sulphate and 35 to 100 percent by weight based on the weight of the polyurethane of at least one higher aliphatic carboxylic acid selected from the group consisting of stearic acid, palmitic acid and myristic acid, in a pellicle form, whereafter immersing the coated material in water or an aqueous solution of the said inorganic salt to coagulate the polymer and subsequently washing the coagulated matter with water and drying it thereby forming a microporous layer; or a method of producing a suede leather-like microporous sheet material which comprises further grinding or buffing the top surface of the above obtained microporous sheet.

The polyurethane to be used in the present invention may be any conventionally used as a polyurethane elastomer. Generally, an organic diisocyanate and a polyalkylene ether glycol or a polyester having terminal hydroxyl groups are reacted with each other to produce a prepolymer and the prepolymer is subjected to a chain-extending reaction with a chain-extender such as a diamine, diol or polyol to form a linear polyurethane elastomer.

In the production of a polyurethane elastomer, organic diisocyanates are exemplidied by aromatic, aliphatic or alicyclic diisocyanates or a mixture thereof, such as, for example, toluylene-2,6-diisocyanate, toluylene-2,4-diisocyanate, diphenylmethane-4,4'-diisocyanate, 1,5-naphthylene diisocyanate, hexamethylene diisocyanate or para-xylylene diisocyanate. As examples of polyalkylene ether glycols, mention may be made of polyethylene ether glycol, polypropylene ether glycol, polytetramethylene ether glycol or polyhexamethylene ether glycol or a copolymer or mixture thereof. Polyols such as glycerin or trimethylol propane may also be used. The polyesters which may be used in the production of a polyurethane elastomer include polycondensation products of organic acids and glycols. Preferable glycol may be a polyalkylene glycol such as ethylene glycol, propylene glycol, tetramethylene glycol or hexamethylene glycol; a cyclic glycol such as cyclohexane diol; or an aromatic glycol such as xylylene glycol. As examples of organic acids, there may be mentioned succinic acid, adipic acid, sebacic acid or terephthlic acid. The polyester having terminal hydroxyl groups may be obtained by ring-opening polymerization of a lactone in the presence of a small amount of a glycol or by polycondensation reaction of an excess diol and a dicarboxylic acid. Preferably an average molecular weight of the polyester is about 500 to 3,000. As the lactone, there may be mentioned, for example, delta-valerolactone, gamma-butyrolactone and epsilon-caprolactone.

As an example of chain extender, there may be mentioned diamine such as hydrazine, ethylene diamine or methylene diorthochloraniline.

As a catalyst, there may be employed, for example triethylamine, triethylene diamine, N-ethyl morpholine, dibutyl-tin-dilaurate or cobalt naphthenate.

Since these polyurethanes are well known per se in the art, no further detailed explanation thereof will be necessary.

The polyurethane thus prepared is dissolved in a water-miscible organic solvent to prepare a coating solution. If desired, a small amount of other film forming polymer(s) soluble in said solvent, for example, vinylic homopolymer or copolymer such as polyvinyl chloride, polyvinyl alcohol, polyacrylonitrile, polyacrylic ester or polyacrylic acid may be added to the polyurethane solution.

It is essential that the solvent for polyurethane should be extractable with water, an alcohol or an aqueous solution of said inorganic salt. Therefore, a water-miscible organic solvent is used. Such a solvent is exemplified by N,N'-dimethylformamide, dimethylsulfoxide, tetrahydrofuran, tetramethylurea, N,N'-dimethylacetamide, dioxane or butylcarbinol and may be used alone or in combination. However, the most preferable solvent is N,N'-dimethylformamide. Further, ketones (e.g., acetone, methylethylketone etc.) which are not good solvents for polyurethane as alone but are well miscible with the polymer solution may be used as a diluent in such a range that coagulation of the polymer may not be caused.

The polyurethane solution to be used in the present invention is a viscous solution containing homogeneously the above-mentioned polyurethane elastomer, fine particles of said inorganic salt and said higher aliphatic carboxylic acid and, if desired, the solution may further contain a coloring agent (dyestuff or pigment), light stabilizer, antistatic agent, dispersing agent such as metal soaps or surfactants, reinforcing agent (e.g., talc) and any other additive.

The coating polymer solution may be prepared by dissolving the polyurethane elastomer in said organic solvent and then admixing fine particles of said inorganic salt and said higher aliphatic carboxylic acid, along with other additive, if required, to the solution or by dissolving directly a mixture of the polyurethane elastomer, said inorganic salt and said higher aliphatic carboxylic acid and if required, an additive in the organic solvent.

The amount of the polyurethane elastomer to be contained in said solution may vary depending on the polymerization degree and chemical structure. However, the concentration of the polyurethane in said solution is preferably within such a range that the solution as added with a required amount of said inorganic salt and said higher aliphatic carboxylic acid may remain in the form of a solution (i.e., remain stable) for a long period of time at a temperature not exceeding 45° C and may be adjustable to a viscosity of 10,000 to 150,000 cps. under which the solution can be readily applied onto a substrate or base material. Specifically, the amount of the polyurethane elastomer (polymer concentration in the solution) is suitably 5 to 20 percent by weight, preferably 7.5 to 15 percent by weight based on the weight of the coating solution. If below 5 percent by weight, the coagulating velocity will be unduly low and the properties or performances of the resulting film will be likely to deteriorate. In case of above 20 percent by weight, the viscosity will be so high that the coating operation will be difficult and the quality of the resulting film will also be likely to deteriorate.

The coating solution of the present invention thus prepared is highly storage-stable and may be employed immediately after the preparation or after preserving for a long period of time without degrading performances of the resulting coagulated microporous sheet.

In accordance with the known method wherein the coating solution is a polyurethane solution containing solely a higher aliphatic carboxylic acid, it is necessary to leave the solution to stand for 12 to 48 hours at a temperature of 35° to 45°C for aging after the preparation, because a sheet of nonuniform microporous structure is formed when the coating solution is applied immediately after the preparation. It should be noted that in the present invention, however, such disadvantages or drawbacks can be completely eliminatd by the coexistence of an inorganic salt and a higher aliphatic carboxylic acid as specified above.

The amounts of said inorganic salt and said higher aliphatic carboxylic acid to be added to the polymer solution vary depending on the concentration of the polyurethane elastomer in the coating solution and also the nature and concentration of the said salt in the coagulating bath, but is generally in the ranges of 100 to 500 percent by weight and 35 to 100 percent by weight, respectively, based on the polyurethane elastomer. More preferably, the former is in a range of 150 to 400 percent by weight and the latter, in a range of 55 to 80 percent by weight based on the polyurethane elastomer.

If the amount of said inorganic salt is less than 100 percent by weight and the amount of said higher aliphatic carboxylic acid is less than 35 percent by weight, the properties of the resulting film will be deteriorated since conical macro-pores will be formed in the interior of the resulting film and the color shade will be not clear when a coloring agent is mixed therewith. If the amount of said inorganic salt is less than 100 percent by weight and the amount of said higher aliphatic carboxylic acid is more than 100 percent by weight, the coagulation velocity of the coating solution will be remarkably low and the resulting film will be remarkably degraded since irregular crack-like pores will be formed in the interior of the film.

On the other hand, if the amount of said inorganic salt is more than 500 percent by weight and the amount of said higher aliphatic carboxylic acid is less than 35 percent by weight, numerous spongecake-like spherical pores will be formed in the interior of the resulting film and properties (e.g., abrasion resistance) of the film will be deteriorated. Particularly when the top surface of the resulting film is ground or buffed to form a suede leather-like sheet, the buffing operation and the control of buff-off amount will be difficult. Further when a coloring agent is compounded, the tone of the colored film will be dull or dead. If the amount of said inorganic salt is more than 500 percent by weight and the amount of said higher aliphatic carboxylic acid is more than 100 percent by weight, the coagulation velocity will be remarkably low, and numerous spongecake-like spherical pores and irregular crack-like pores will be generated in the interior of the resulting film so that the properties such as abrasion resistance or strength of the film will be highly degraded.

The inorganic salt which is incorporated in the polyurethane elastomer solution is selected from the group consisting of sodium chloride, potassium chloride, sodium sulphate and potassium sulphate, and may be used alone or in combination. Since the said inorganic salts are non-hygroscopic but easily soluble in water, they can be readily dissolved and removed in the coagulating bath or water leaching bath in the subsequent step. When using, a required amount of said inorganic salt is added in the form of dried and finely divided particles to the polyurethane solution with other additives and is mixed sufficiently until uniformly dispersed. The particle size of said inorganic salt is suitably not more than 70 microns, preferably not more than 50 microns. When the particle size of said inorganic salt is larger, it is difficult to maintain homogeneity of the polyurethane solution for a long period of time and also difficult to obtain a uniform microporous sheet.

The higher aliphatic carboxylic acid to be added together with said inorganic salt to the polyurethane solution is selected from the group consisting of myristic acid, palmitic acid and stearic acid and may be used alone or in combination. In the preparation of a coating solution, a required amount of said higher aliphatic carboxylic acid in the form of powders or flakes is added together with other additives to the polyurethane solution and is mixed thoroughly until a uniform solution is obtained.

The inorganic salt, higher aliphatic carboxylic acid and other additives such as coloring agent may be compounded in the polyurethane elastomer solution with a kneader, mixing roll or other mixer.

According to the present invention, the best results are attained by the combination of sodium chloride and stearic acid or by the combination of sodium sulphate and stearic acid, among various combinations of said inorganic salt and said higher aliphatic carboxylic acid.

The polyurethane elastomer coating solution thus prepared is, before being led into a coagulating bath, applied to a suitable base material or substrate for synthetic leathers such as woven fabric, knitted fabric, non-woven fabric, sponge or paper, or to a film making plate such as a glass plate, metal plate, plastic plate or plastic film by means of knife-coating, roller coating or spraying, in a form of thin film. In this case, since the coating solution used in the present invention does not contain a non-solvent such as water or a hygroscopic inorganic salt such as calcium chloride, calcium nitrate and the like, elevation of its viscosity and gelation will not occur even if it absorbs more or less water or moisture during the coating step and the coagulating step. Therefore, the coating operation can be readily conducted even in a high humid atmosphere and the coagulation in a coagulating bath is smoothly performed. Thus an excellent microporous sheet may be resulted.

It should be noticeable that it is not necessary at all to so strictly adjust and control the atmosphere (i.e., relative humidity and temperature) during the coating and subsequent operations as in the process mentioned in Japanese Patent Application Publication No. 20,273/65 (Belgian Patent No. 636,018), so that industrial practice of the process according to this invention may be exceedingly facilitated.

As the coagulating bath of this invention, there may be used water or an aqueous solution of at least one inorganic salt selected from the group consisting of sodium sulphate, sodium chloride, potassium sulphate and potassium chloride.

The concentration of an aqueous solution of said inorganic salt in the coagulating bath may vary depending on the kind of the salt, the amount of the inorganic salt in the polyurethane elastomer coating solution and the concentration of the polyurethane elastomer solution, but is generally suitably below the amount (by weight) corresponding to two-thirds, preferably below one-third and most preferably below one-fifth the concentration of the saturated aqueous solution. At such high concentration as above two-thirds the saturation, the coagulating velocity of the polyurethane solution film will be reduced so much that the resulting coagulating film will form a too compact structure and therefore it will be difficult to obtain a desired porous sheet.

The coagulating bath temperature may be suitably in a range of 5° to 50°C, preferably 20° to 40°C.

Advantages in the use of the coagulating bath of the present invention are that water and said inorganic salt in the bath are inexpensive and economical and even if much amount of N,N'-dimethylformamide is accumulated in the coagulating bath during its successive use for a long period of time, coagulation may be normally performed by a special coagulating (regenerating) action of the inorganic salts in the coagulating bath as well as in the polyurethane elastomer solution whereby a microporous sheet having excellent performances can be formed.

It is also advantageous that the said inorganic salt in the coagulating bath is chemically inert to such a solvent for polyurethane elastomer as N,N'-dimethylformamide so that there is no danger of inducing a hydrolysis as in the case of an acidic salt and therefore the solvent can be recovered readily and smoothly. During coagulation step, the higher aliphatic carboxylic acid in the coated film is extricated from the film and floats over the surface of the coagulating bath so that it can be easily separated.

It is desirable and convenient that the coagulating bath temperature is near standard or room temperature. However, as the case may be, the temperature may be varied so that the coagulating activity of the salt solution may be varied. In general, at the same salt concentration, there is a tendency that, the lower the temperature, the lower the coagulating activity is, while the higher the temperature, the higher the coagulating velocity is. However, the temperature range showing a favorable coagulation and regeneration is sufficiently wide so that there would be no difficulty in selecting bath temperature.

When an aqueous solution of said inorganic salt is employed as a coagulating bath, better results can be obtained in case that the same kind of inorganic salt in the coagulating bath as that in the coating solution be selected.

The base material or, substrate or plate for film making coated with the coating solution in a required thickness is immersed in the coagulating bath i.e., water or an aqueous solution of said inorganic salt which has been prepared under appropriate conditions as described above, for a specified period of time to coagulate and regenerate the polyurethane elastomer.

Subsequently the coagulated film of polyurethane elastomer is washed with water to leach out and thoroughly remove the inorganic salt, higher aliphatic carboxylic acid and water-miscible organic solvent that have been still remained in the said film, and then dried.

When the coating polymer solution is applied onto a film-making plate such as a glass plate, metal plate or plastic plate and is coagulated and regenerated thereon, the resulting film having a porous structure will be formed as bonded and laminated on said plate. Therefore, it is washed with water and dried and then the film is peeled off the plate. The thus-obtained film is tough and light, and remarkably excellent in the abrasion resistance, impact resistance, softness and moisture-permeability.

On the other hand, when the coating polymer solution is applied to a fibrous or other base material suitable for synthetic leathers, such as a woven fabric, knitted fabric, nonwoven fabric, film, sponge or paper and coagulated thereon, the resulting film having a microporous structure is formed in an adhered and laminated state on said base material, and then washed with water and dried. Thus the microporous sheet having excellent toughness, softness, abrasion resistance, impact resistance and moisture-permeability can be obtained. The resulting product may be employed as an artificial leather.

When the smooth surface portion of the porous layer bonded and laminated in the above mentioned base material is further subjected to buffing with a leather grinding (buffing) apparatus provided with a grinding paper coated with silica, emery, aluminum oxide, silicon carbide or the like, there will be obtained a suede-like sheet material excellent in the appearance, hand, abrasion resistance and moisture-permeability. In this case, when the said sheet is compounded with a coloring agent, a suede-like sheet having a clear, bright color tone can be obtained.

When the cross-section of the resulting porous layer structure made by applying the polymer solution onto one or both surfaces of a base material such as a woven fabric, knitted fabric, nonwoven fabric, paper or the like or a film making plate such as a glass plate, metal plate, plastic plate or the like and subjecting to coagulation and regeration is microscopically examined, there are observed numerous spherical pores of diameters of ca. 20 to 80 microns uniformly distributed which are arranged contiguously in the substantially vertical direction to the sheet surface and which are intercommunicated with each other by a short crack-like micropore vertical to the sheet surface to form, as a whole, so-called bead-like connected spherical micropores. Thus numerous bead-like connected spherical micropores are parallelly arranged contiguously with relatively long distance (separated by partition walls). In accordance with the invention, by the formation of this unique structure and shape of micropores that have never seen in prior art microporous sheets, the resulted microporous sheet material exhibits excellent performances i.e., light weight, good toughness, abrasion resistance, moisture-permeability and softness.

In accordance with the method of the invention, the resulted microporous sheet is superior in toughness, abrasion resistance and impact resistance since no spongecake-like microporous structure is formed in the interior as in the case of a coating solution containing solely a higher aliphatic carboxylic acid as aforementioned. Further it is very easy to carry out buffing operation and to regulate the buffing amount when the smooth surface of the microporous sheet is buffed to produce a suede leather-like finish. Furthermore, in accordance with the present invention, when the smooth surface of the microporous sheet is buffed to form a suede-like sheet, it is also possible to bring about a colored microporous sheet having a clear and deep tone without changing its original color tone or giving a dead, dull color tone, because the micropores in the interior of the microporous sheet are uniform in size and are constructed regularly as a whole so that random reflection of light is not likely to occur.

The accompanying

The microporous sheet obtained in accordance with the present invention is superior in abrasion resistance and impact resistance and remarkably superior in moisture-permeability to those of prior art microporous sheet as described in British Patent No. 1,129,122 wherein a specifed higher aliphatic carboxylic acid is solely incorporated in a polyurethane solution and long, crack-like micropores are formed. In the present invention, even though more than 30 percent by weight of the higher aliphatic carboxylic acid is incorporated in the polyurethane solution, neither the coagulating velocity becomes low nor non-porous film is formed, as in the case of British Patent No. 1,129,122 as above.

These eminent differences in effect between the present invention and the prior arts are ascribed to a synergistic or co-operative action of the specified higher aliphatic carboxylic acid and inorganic salt present in the coating solution.

The microporous sheet material obtained by the method of the invention is useful for upholsteries, room interior decorations, packages, handbags, gloves, boots, shoes and clothes. The suede-like sheet is useful for shoe uppers, jackets and other coats, decorative leather liners, suitcases and covers of tables and rolls.

The following examples illustrate the invention wherein all parts are by weight. In these examples, the breaking strength and elongation were measured by using a specimen with a width of 2 cm and cramp length of 5 cm at a tensioning speed of 3 cm/min. with a tensile tester. The moisture-permeability was determined by the method of JIS-6429. Further, the surface wear was determined in accordance with the method of JIS—L—1048—59, and is expressed by friction cycle (frequency) till the microporous film is completely worn out by frictioning.

EXAMPLE 1

To 1,000 parts of a 25 percent solution of ester type polyurethane elastomer in N,N'-dimethylformamide (made by Nippon Reichhold Kabushiki Kaisha: trade mark, "Krisbon—6265") were added and mixed thoroughly the inorganic salt and higher aliphatic carboxylic acid in varying amounts as shown in Table 1 given below to prepare corresponding coating solutions. Each of the coating solutions was knife-coated onto a non-woven fabric of polyethylene terephthalate fiber in a thickness of 1.0 mm, and then immersed in a coagulating bath, i.e., a 5 percent (weight) aqueous solution of the same inorganic salt as that in the coating solution at 30°C for 20 minutes to coagulate the polymer. Subsequently, the fabric with the film formed thereon was washed with water at 50°C for 60 minutes to remove the N,N'-dimethylformamide, inorganic salt and higher aliphatic carboxylic acid remaining in the film and thereafter was air-dried at 100°C for 10 minutes.

The thus-obtained regenerated polyurethane film was observed microscopically of its cross-sectional structure and determined with respect to its moisture-permeability, surface wear and specific gravity. The results are shown in Table 1. As apparent from those results, the microporous film obtained from the coating solution containing 100 to 500 parts of the inorganic salt and 35 to 100 parts of the higher aliphatic carboxylic acid based on 100 parts of polyurethane has a microporous structure of numerous, so-called bead-like connected spherical micropores wherein homogeneous spherical micropores with ca. 20 to 80 microns in diameter are arranged contiguously and intercommunicated with each other by a short, crack-like micropore substantially vertical to the sheet surface. The formed film has remarkably superior moisture-permeability, abrasion resistance and softness. Particularly, above all, the film from the coating solution containing 150 to 400 parts of the inorganic salt and 55 to 80 parts of the higher aliphatic carboxylic acid is more excellent in these performances.

Comparative articles were prepared in a similar manner to afore-mentioned procedure except that sole polyurethane elastomer solution, polyurethane solution containing solely the inorganic salt and polyurethane solution containing solely the higher aliphatic carboxylic acid were employed respectively as a coating solution. The results are also shown in Table 1.

TABLE 1

| Additive in coating solution | | | | | Performances of film | | |
|---|---|---|---|---|---|---|---|
| Inorganic salt | Percent | Aliphatic carboxylic acid | Percent | Interior structure of film; cross-sectional structure and shape of pores | Sp. gr. (g/cm³) | Moisture-permeability (mg/cm²/hr) | Surface wear (cycle) |
| NaCl | 550 | | | A few voids | 0.72 | 0.40 | 3200 |
| NaCl | 500 | | | Spongecake-like spherical pores | .29 | 5.2 | 650 |
| NaCl | 400 | | | do | .30 | 5.0 | 700 |
| NaCl | 200 | | | do | .35 | 4.2 | 750 |
| NaCl | 150 | | | do | .35 | 4.1 | 770 |
| NaCl | 100 | | | do | .36 | 4.0 | 800 |
| NaCl | 90 | | | do | .38 | 3.1 | 900 |
| | | | | do | .38 | 2.9 | 980 |

TABLE 1.—Continued

| Additive in coating solution | | | | | Performances of film | | |
|---|---|---|---|---|---|---|---|
| Inorganic salt | Percent | Aliphatic carboxylic acid | Percent | Interior structure of film; cross-sectional structure and shape of pores | Sp. gr. ($g/cm^3$) | Moisture-permeability ($mg/cm^2/hr$) | Surface wear (cycle) |
| | | Str. acid | 110 | Substantially non-porous | 0.91 | 0.1 | 3300 |
| | | do | 100 | do | .90 | .1 | 3200 |
| | | do | 90 | do | .90 | .2 | 3150 |
| | | do | 80 | do | .85 | .2 | 3100 |
| | | do | 55 | Crack-like pores | .80 | 3.5 | 1800 |
| | | do | 35 | do | .81 | 3.1 | 1900 |
| | | do | 30 | Irregular crack-like pores | .49 | 4.9 | 1500 |
| | | do | 20 | do | .51 | 3.9 | 1620 |
| NaCl | 550 | do | 100 | Spongecake-like spherical pores and macro-voids | .30 | 3.1 | 1150 |
| NaCl | 550 | do | 80 | do | .31 | 3.5 | 1100 |
| NaCl | 550 | do | 55 | Spongecake-like spherical pores | .35 | 4.1 | 1200 |
| NaCl | 550 | do | 35 | do | .33 | 4.5 | 1350 |
| NaCl | 500 | do | 110 | Spongecake-like spherical pores and conical macropores | .32 | 5.2 | 1900 |
| NaCl | 500 | do | 100 | Bead-like linked spherical micropores | .33 | 6.3 | 2500 |
| NaCl | 500 | do | 90 | do | .33 | 6.8 | 2550 |
| NaCl | 500 | do | 80 | do | .34 | 8.5 | 2950 |
| NaCl | 500 | do | 55 | do | .33 | 10.8 | 2950 |
| NaCl | 500 | do | 35 | do | .35 | 8.9 | 2800 |
| NaCl | 500 | do | 30 | Bead-like linked spherical micropores and conical pores | .36 | 7.1 | 1550 |
| NaCl | 400 | do | 110 | Spongecake-like spherical pores and conical macropores | .39 | 5.6 | 1800 |
| NaCl | 400 | do | 100 | Bead-like linked spherical micropores | .37 | 6.8 | 2400 |
| NaCl | 400 | do | 90 | do | .36 | 7.0 | 2500 |
| NaCl | 400 | do | 80 | do | .35 | 9.2 | 3150 |
| NaCl | 400 | do | 55 | do | .34 | 10.5 | 3250 |
| NaCl | 400 | do | 35 | do | .35 | 9.8 | 2900 |
| NaCl | 400 | do | 30 | Spongecake-like spherical pores and conical pores | .36 | 6.2 | 1850 |
| NaCl | 300 | do | 110 | Spongecake-like spherical pores and bead-like linked spherical pores | .39 | 6.5 | 1800 |
| NaCl | 300 | do | 100 | Bead-like linked spherical micropores | .35 | 7.5 | 2400 |
| NaCl | 300 | do | 90 | do | .35 | 7.6 | 2550 |
| NaCl | 300 | do | 80 | do | .36 | 10.3 | 3250 |
| NaCl | 300 | do | 55 | do | .35 | 10.1 | 3200 |
| NaCl | 300 | do | 35 | do | .36 | 8.1 | 3050 |
| NaCl | 300 | do | 30 | Major conical macropores and bead-like linked spherical pores | .32 | 7.5 | 1800 |
| NaCl | 200 | do | 110 | Spongecake-like spherical pores and conical pores | .38 | 6.8 | 1800 |
| NaCl | 200 | do | 100 | Bead-like linked spherical micropores | .36 | 8.5 | 2700 |
| NaCl | 200 | do | 90 | do | .35 | 9.2 | 2800 |
| NaCl | 200 | do | 80 | Bead-like linked spherical micropores | .34 | 9.8 | 3400 |
| NaCl | 200 | do | 55 | do | .34 | 10.2 | 3500 |
| NaCl | 200 | do | 35 | do | .36 | 7.8 | 2950 |
| NaCl | 200 | do | 30 | Major conical macropores and spongecake-like spherical pores | .39 | 5.2 | 2100 |
| NaCl | 100 | do | 110 | Major spongecake-like pores and crack-like pores | .38 | 6.5 | 2950 |
| NaCl | 100 | do | 100 | Bead-like linked spherical micropores | .37 | 7.8 | 2700 |
| NaCl | 100 | do | 90 | do | .36 | 8.2 | 2800 |
| NaCl | 100 | do | 80 | do | .36 | 9.8 | 3050 |
| NaCl | 100 | do | 55 | do | .35 | 10.2 | 3400 |
| NaCl | 100 | do | 35 | do | .36 | 9.0 | 3050 |
| NaCl | 100 | do | 30 | Major spongecake-like pores and conical macropores | .39 | 5.8 | 1900 |
| NaCl | 190 | do | 100 | Spongecake-like spherical pores and crack-like pores | .39 | 6.1 | 1900 |
| NaCl | 90 | do | 80 | do | .40 | 6.2 | 1900 |
| NaCl | 90 | do | 55 | Spongecake-like spherical pores and conical pores | .40 | 6.2 | 1850 |
| NaCl | 90 | do | 35 | do | .39 | 6.3 | 1900 |
| NaCl | 200 | Palm. acid | 100 | Bead-like linked spherical micropores | .36 | 8.5 | 2700 |
| NaCl | 200 | do | 80 | do | .35 | 9.5 | 3400 |
| NaCl | 200 | do | 55 | do | .34 | 10.2 | 3300 |
| NaCl | 200 | do | 35 | do | .36 | 8.2 | 2850 |
| NaCl | 200 | Myr. acid | 100 | do | .36 | 8.4 | 2600 |
| NaCl | 200 | do | 80 | do | .35 | 9.6 | 3400 |
| NaCl | 200 | do | 55 | do | .34 | 10.2 | 3350 |
| NaCl | 200 | do | 35 | do | .36 | 8.2 | 2800 |
| $Na_2SO_4$ | 200 | Str. acid | 100 | do | .35 | 8.5 | 2500 |
| $Na_2SO_4$ | 200 | do | 80 | do | .34 | 9.4 | 3300 |
| $Na_2SO_4$ | 200 | do | 55 | do | .33 | 9.9 | 3400 |
| $Na_2SO_4$ | 200 | do | 35 | Bead-like linked spherical micropores | .36 | 8.0 | 2850 |
| $Na_2SO_4$ | 200 | Palm acid | 100 | do | .36 | 7.9 | 2700 |
| $Na_2SO_4$ | 200 | do | 80 | do | .35 | 8.9 | 3500 |
| $Na_2SO_4$ | 200 | do | 55 | do | .34 | 9.9 | 3450 |
| $Na_2SO_4$ | 200 | do | 35 | do | .36 | 8.1 | 2800 |
| $Na_2SO_4$ | 200 | Myr. acid | 55 | do | .35 | 9.9 | 3400 |
| $K_2SO_4$ | 200 | Str. acid | 55 | do | .34 | 10.2 | 3350 |
| $K_2SO_4$ | 200 | Palm acid | 55 | do | .34 | 10.4 | 3400 |
| $K_2SO_4$ | 200 | Myr. acid | 55 | do | .35 | 10.1 | 3300 |
| KCl | 200 | Palm acid | 55 | do | .34 | 10.3 | 3450 |
| KCl | 200 | Str. acid | 55 | do | .34 | 10.2 | 3300 |
| KCl | 200 | Palm acid | 55 | do | .34 | 10.1 | 3100 |

EXAMPLE 2

The procedure for Example 1 was exactly duplicated, except that water bath at 30°C was substitued for the aqueous solution of the inorganic salt.

The results are shown in Table 2 given below. As apparent from the Table, the obtained microporous sheet has superior performances as compared with those of prior art articles wherein sole inorganic salt or higher aliphatic carboxylic acid is used as an additive in the coating solution. The results of this example are a little inferior in moisture-permeability and abrasion resistance as compared with Example 1 wherein the aqueous solution of the inorganic salt is used as a coagulating bath.

EXAMPLE 3

To 1,000 parts of a 25 percent solution of ester type polyurethane elastomer in N,N'-dimethylformamide (trade name: Krisbon, made by Nippon Reichhold Co.) were admixed 500 parts of sodium chloride having particle sizes of ca. 30 to 50 microns, 138 parts of stearic acid, and 50 parts of a pigment which was C.I. Solvent Red 24, C.I.Solvent Blue 11 or furnace carbon black to prepare three coating solutions each having a viscosity of 60,000 cps at 25°C. The coating solution was applied by a coating roller to a polyester fiber non-woven fabric having a thickness of 0.6 mm in a thickness of 0.8 mm and the coated fabric was introduced at an angle of 60° into a water bath at 30°C for 20 minutes to coagulate

TABLE 2

| Additive in coating solution | | | | Interior structure of film; cross-sectional structure and shape of pores | Performances of film | | |
|---|---|---|---|---|---|---|---|
| Inorganic salt | Percent | Aliphatic carboxylic acid | Percent | | Sp. gr. (g/cm$^3$) | Moisture-permeability (mg/cm$^2$/hr) | Surface wear (cycle) |
| NaCl | 500 | | | A few macro voids | 0.72 | 0.40 | 3250 |
| NaCl | 400 | | | Spongecake-like spherical pores | .29 | 4.9 | 650 |
| NaCl | 200 | | | do | .30 | 4.1 | 700 |
| NaCl | 150 | | | do | .35 | 4.0 | 750 |
| NaCl | 100 | | | do | .35 | 3.0 | 800 |
| | | Str. acid | 100 | do | .38 | 2.9 | 800 |
| | | do | 80 | Substantially non-porous | .90 | .1 | 3200 |
| | | do | 55 | do | .90 | .1 | 3100 |
| | | do | 35 | Crack-like pores | .50 | 3.7 | 1800 |
| | | do | 30 | do | .48 | 3.8 | 1300 |
| | | do | | do | .45 | 3.9 | 1350 |
| NaCl | 500 | do | 110 | Spongecake-like spherical pores and conical macropores. | .35 | 5.0 | 1800 |
| NaCl | 500 | do | 100 | Bead-like linked spherical micropores | .33 | 6.0 | 2450 |
| NaCl | 500 | do | 80 | do | .33 | 6.5 | 2500 |
| NaCl | 500 | do | 55 | do | .34 | 8.0 | 2900 |
| NaCl | 500 | do | 35 | do | .33 | 8.0 | 2700 |
| NaCl | 500 | do | 30 | Bead-like linked spherical micropores and conical macropores. | .36 | 6.9 | 1450 |
| NaCl | 400 | do | 110 | Spongecake-like spherical pores and conical macropores. | .35 | 5.0 | 1750 |
| NaCl | 400 | do | 100 | Bead-like linked spherical micropores | .34 | 6.2 | 2300 |
| NaCl | 400 | do | 80 | do | .33 | 9.0 | 2900 |
| NaCl | 400 | do | 55 | do | .33 | 10.8 | 3100 |
| NaCl | 400 | do | 35 | do | .34 | 7.9 | 2900 |
| NaCl | 400 | do | 30 | Spongecake-like spherical pores and conical macropores. | .36 | 5.8 | 1800 |
| NaCl | 200 | do | 110 | Spongecake-like spherical pores and conical pores | .38 | 6.8 | 1700 |
| NaCl | 200 | do | 100 | Bead-like linked spherical micropores | .36 | 8.0 | 2600 |
| NaCl | 200 | do | 80 | do | .35 | 9.0 | 3300 |
| NaCl | 200 | do | 55 | do | .34 | 10.0 | 3400 |
| NaCl | 200 | do | 35 | do | .36 | 7.8 | 2900 |
| NaCl | 200 | do | 30 | Spongecake-like spherical pores and conical macropores. | .39 | 5.0 | 2000 |
| NaCl | 100 | do | 110 | Spongecake-like spherical pores and crack-like pores | .38 | 6.3 | 1900 |
| NaCl | 100 | do | 100 | Bead-like linked spherical micropores | .37 | 7.6 | 2700 |
| NaCl | 100 | do | 80 | do | .36 | 9.6 | 2950 |
| NaCl | 100 | do | 55 | do | .35 | 10.0 | 3300 |
| NaCl | 100 | do | 35 | do | .36 | 8.9 | 3050 |
| NaCl | 100 | do | 30 | Spongecake-like spherical pores and conical macropores. | .39 | 6.0 | 1850 |
| NaCl | 200 | Palm acid | 100 | Bead-like linked spherical micropores | .36 | 8.5 | 2600 |
| NaCl | 200 | do | 80 | do | .35 | 9.5 | 3200 |
| NaCl | 200 | do | 55 | do | .34 | 10.0 | 3300 |
| NaCl | 200 | do | 35 | do | .36 | 8.0 | 2800 |
| NaCl | 200 | Myr. acid | 80 | do | .35 | 9.6 | 3300 |
| NaCl | 200 | do | 55 | do | .34 | 10.2 | 3100 |
| Na$_2$SO$_4$ | 200 | Str. acid | 100 | do | .35 | 8.4 | 2400 |
| Na$_2$SO$_4$ | 200 | do | 80 | do | .34 | 9.2 | 3100 |
| Na$_2$SO$_4$ | 200 | do | 55 | do | .33 | 9.8 | 3300 |
| Na$_2$SO$_4$ | 200 | do | 35 | do | .36 | 7.8 | 2800 |
| Na$_2$SO$_4$ | 200 | Palm acid | 100 | do | .35 | 7.8 | 2700 |
| Na$_2$SO$_4$ | 200 | do | 80 | do | .34 | 8.8 | 3400 |
| Na$_2$SO$_4$ | 200 | do | 55 | do | .33 | 9.6 | 3300 |
| Na$_2$SO$_4$ | 200 | do | 35 | do | .36 | 8.0 | 2700 |
| K$_2$SO$_4$ | 200 | do | 55 | do | .34 | 10.1 | 3200 |
| K$_2$SO$_4$ | 200 | Str. acid | 55 | do | .34 | 10.2 | 3300 |
| KCl | 200 | do | 55 | do | .34 | 10.0 | 3400 |
| KCl | 200 | Palm acid | 55 | do | .34 | 10.2 | 3300 | and regenerate the polyurethane. Subsequently the fabric with a coagulated film was washed in a hot water bath at 50°C for 30 minutes, treated to remove water therefrom, dried in a air dryer at 110°C for 10 minutes and wound up on a roll. The surface of the thus-obtained microporous sheet was buffed or ground with a sand paper in a depth of 0.2 mm to make a suede-like sheet material.

The resulted suede-like sheet has a density of 0.49 to 0.55 g/cm³ and exhibits excellent abrasion resistance and moisture-permeability as shown in Table 3 given below.

Figure 1:
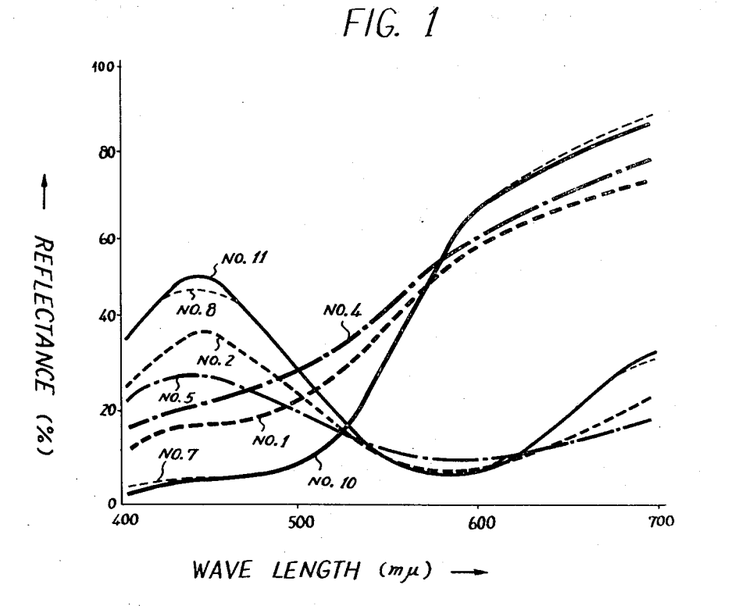
FIG. 1 and FIG. 2 are graphs showing such a deep, clear color tone of the invention.
Figure 2:
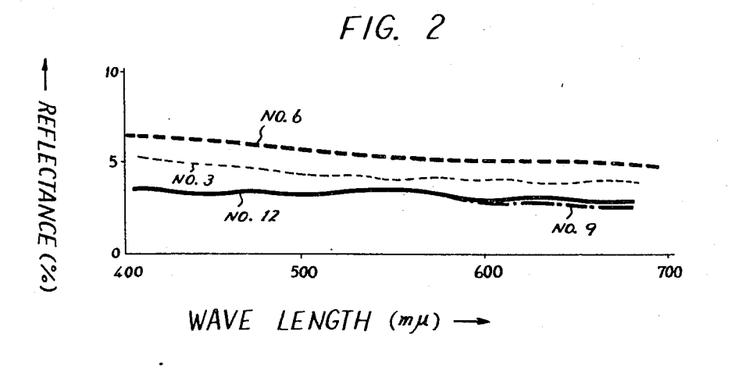

The colour shade was determined by measuring surface reflectance with an autographical spectrophotometer (made by General Electric Co.) and the results are shown in the accompanying FIGS. 1 and 2.

As apparent from the drawings, the articles obtained by the present invention have remarkably clear and deep color shade.

Comparative examples were also conducted in a similar manner to the afore-mentioned procedure except that a sole polyurethane solution (with no additive), a polyurethane solution containing solely the inorganic salt or a polyurethane solution solely containing the higher aliphatic carboxylic acid was used as a coating solution instead of the polyurethane solution containing both the inorganic salt and the higher aliphatic carboxylic acid.

lating bath consisting of water or an aqueous solution of sodium chloride as shown in Table 4 as given below at 30°C for 30 minutes to coagulate and regnerate the polymer. Thereafter the plate with coagulated polymer was transferred in water at 50°C, where the regenerated and coagulated film of polyurethane was peeled off from the plate and washed repeatedly with water, and then air-dried at 105°C for 10 minutes. The properties of the thus-obtained film having a microporous structure were measured and shown in Table 4.

From these results, it will be seen that a microporous film having superior flexibility, softness and moisture-permeability is formed when an aqueous solution of sodium chloride is used as a coagulating bath, but the higher the amount of the salt, the lower its microporosity is likely to be, in other words, the more increased the specific gravity is. In that case, similar results are shown and as a result, excellent microporous sheets can also be produced when potassium sulphate or sodium sulphate is used instead of the sodium chloride.

Comparative films were also prepared in a similar manner except that sole sodium chloride or sole stearic acid was used as an additive in the coating solution instead of the combination of sodium chloride and stearic acid.

TABLE 4

| Coating soln. (additive) | Coagulating bath | Structure of regenerated film | Thickness (mm) | Sp. gr. (g/cm³) | Moisture-permeability (mg/cm²/hr) | Surface wear (cycle) |
| --- | --- | --- | --- | --- | --- | --- |
| | Water | Bead-like linked spherical micropores. | 0.82 | 0.32 | 11.6 | 2600 |
| NaCl and stearic acid | A 5% aq. soln. of NaCl | do | .78 | .34 | 14.5 | 3100 |
| | A 10% aq. soln. of NaCl | do | .72 | .40 | 13.8 | 3300 |
| NaCl (sole) | A 5% aq. soln. of NaCl | Macropores | .78 | .36 | 6.1 | 650 |
| Stearic acid (sole) | do | Film is not formed since no coagulation occurs. | | | | |

TABLE 3

| No. | NaCl (part) | Str. acid (part) | Pigment (color) | Surface wear (cycle) | Moisture-permeability (mg/cm²/hr) | Test for tearing off of buffed surface with tweezers |
| --- | --- | --- | --- | --- | --- | --- |
| 1 | | | Red | 1600 | 0.5 | Good. |
| 2 | | | Blue | 1650 | .5 | Do. |
| 3 | | | Black | 1650 | .6 | Do. |
| 4 | 500 | | Red | 550 | 6.2 | Poor. |
| 5 | 500 | | Blue | 550 | 6.3 | Do. |
| 6 | 500 | | Black | 500 | 7.2 | Do. |
| 7 | | 138 | Red | 1300 | 7.2 | Poor. |
| 8 | | 138 | Blue | 1350 | 7.1 | Do. |
| 9 | | 138 | Black | 1300 | 7.2 | Do. |
| 10 | 500 | 138 | Red | 2150 | 11.2 | Good. |
| 11 | 500 | 138 | Blue | 2150 | 11.5 | Do. |
| 12 | 500 | 138 | Black | 2100 | 12.2 | Do. |

EXAMPLE 4

A coating solution having a viscosity of 60,000 cps at 25°C was prepared by admixing 500 parts of sodium chloride having particle sizes of ca. 20 to 40 microns, 150 parts of stearic acid and 50 parts of carbon black with a 25 percent N,N'-di-methylformamide solution of ester type polyurethane elastomer same as used in Example 1, and applied onto a glass plate in a thickness of 1.2 mm. The coated plate was immersed in a coagu-

EXAMPLE 5

To 1,000 parts of a 25 percent N,N'-dimethylformamide solution of ester type polyurethane elastomer as used in Example 1 were admixed 200 parts of N,N'-dimethylformamide, 500 parts of anhydrous sodium sulphate, 140 parts of stearic acid and 50 parts of channel carbon black to prepare a coating solution having a viscosity of 70,000 cps at 25°C. The coating solution was applied onto a cotton satin fabric in a thickness of 0.4 mm and the fabric was immersed in water at 30°C for 10 minutes to coagulate and regenerate the polymer. Then the fabric was treated with a hot water at 50°C for 30 minutes and dried in a hot air dryer at 110°C. The thus-obtained microporous sheet has a moisture-permeability of 8.5 mg/cm²/hr and a surface wear of 2,500 cycles, and is useful for manufacture of shoes and bags. Besides, a microporous sheet was also produced in a manner similar to the procedure described above except that a 5 percent aqueous solution of sodium sulphate was substituted for the water as a coagulating bath. The resulted sheet exhibits a moisture-permeability of 12.0 mg/cm²/hr and a surface wear of 2,600 cycles, which results are improved over the above sheet.

Comparative examples were repeated in an identical manner to the procedure as above except that sole anhydrous sodium sulphate or sole stearic acid was used as an additive in the coating solution instead of the combination of anhydrous sodium sulphate and stearic acid, and respective sheets were prepared. The former sheet has a moisture-permeability of 6.0 mg/cm²/hr, while the latter is of substantially nonporous film and has a moisture-permeability of 0.4 mg/cm²/hr and a surface wear of 3,400 frequencys.

EXAMPLE 6

To 1,000 parts of a 25 percent N,N'-dimethylformamide solution of ester type polyurethane as used in Example 1 were admixed 150 parts of sodium chloride, 138 parts of stearic acid, 50 parts of channel carbon black and 300 parts of N,N'-dimethylformamide to prepare a coating solution having a viscosity of 70,000 cps at 25°C. The coating solution was applied onto a cotton stain fabric in a thickness of 0.7 mm and the fabric was immersed in hot water at 30°C for 10 minutes to coagulate and regenerate the polymer. Subsequently after washing and leaching with hot water at 50°C for 30 minutes, the fabric with coagulated film was dried in a hot air dryer at 110°C. The resulted microporous sheet was buffed and ground with a sand paper in a depth of 0.2 mm from its surface. Thus there was obtained a deep black suede-like sheet wherein numerous spherical micropores with 30 to 50 microns in sizes bead-likely linked with each other were arranged. The suede-like sheet has a strength of 24 Kg/cm², an elongation at break of 22 percent, a moisture-permeability of 12.3 mg/cm²/hr and a surface wear of 2,100 cycles, and is useful for shoes, bags, upholsteries, etc. Besides, the microporous sheet was also prepared in an identical manner as the procedure was described above except that a 5 percent aqueous solution of sodium chloride was substituted for the water as a coagulating bath, which had a moisture-permeability of 15.0 mg/cm²/hr and a surface wear of 2,600 cycles.

For the purpose of comparison, the comparative sheets (controls) were prepared in a similar manner to this example except that sole sodium chloride or sole stearic acid was substituted for the combination of sodium chloride and stearic acid as an additive in a coating solution. The former sheet has a moisture-permeability of 9.1 mg/cm²/hr and a surface wear of 550 cycles, while the latter is substantially nonporous and has a moisture-permeability of 0.4 mg/cm²/hr. Even if buffed or ground, the latter is not finished into a suede-like sheet.

EXAMPLE 7

A polyurethane elastomer coating solution having a viscosity of 60,000 cps at 25°C was prepared by admixing 1,200 parts of anhydrous sodium sulphate, 165 parts of stearic acid and 50 parts of pigment, C.I.Solvent Blue 11 with 1,000 parts of a 30 percent N,N'-dimethylformamide solution of ester type polyurethane, and applied onto a napped surface of flannel fabric in a thickness of 0.7 mm. Thereafter the fabric was immersed in a coagulating bath of a 5 percent aqueous solution of sodium sulphate at 30°C for 10 minutes, treated with hot water at 50°C for 30 minutes and then dried in a hot air dryer at 110°C. The thus-obtained sheet has a moisture-permeability of 11.5 mg/cm²/hr and a surface wear of 3,150 cycles. It exhibits a deep blue color shade and is highly useful for clothings, bags, shoes, interior decorations, etc.

For the comparison, the control sheet was prepared in a similar manner to the procedure as described above except that a polyurethane coating solution containing solely sodium sulphate was substituted for the above-described coating solution, and the resulted sheet had a moisture-permeability of 5.6 mg/cm²/hr and a surface wear of 550 cycles. Also control sheet was prepared similarly from a polyurethane elastomer coating solution containing a solely stearic acid, and the resulted sheet was substantially non-porous and had a moisture-permeability of 0.3 mg/cm²/hr.

EXAMPLE 8

A suede-like sheet was prepared by grinding or buffing the surface of the microporous sheet as obtained in Example 7 with a sand paper in a depth of 0.2 mm. The resulted suede-like sheet is of numerous micropores having diameters of 20 to 40 microns, and has a moisture-permeability of 15.8 mg/cm²/hr, a surface wear of 2,300 cycles and density of 0.43 g/cm³.

Similarly, for the purpose of comparison, a suede-like sheet was prepared from the corresponding control sheet in Example 7 obtained from the coating solution containing solely sodium sulphate. The resulted suede-like sheet has a moisture-permeability of 10.5 mg/cm²/hr and surface wear of 350 cycles. The other control sheet obtained from the coating solution containing solely stearic acid is substantially non-porous and a suede-like sheet can not be formed, even if buffed.

What is claimed is:

1. A method for producing a microporous sheet material having excellent abrasion resistance, moisture permeability, color shade and softness, which comprises the steps of:
    1. applying to the surface of a base material a thin film of a liquid coating material consisting essentially of a uniform mixture of
        a. a polymer solution consisting essentially of polyurethane elastomer dissolved in water-miscible organic solvent,
        b. from 100 to 500 percent by weight, based on the weight of said polyurethane, of particles of inorganic salt selected from the group consisting of sodium sulphate, sodium chloride, potassium chloride, potassium sulphate and mixtures thereof, said particles having a particle size of not more than about 70 microns, and
        c. from 55 to 80 percent by weight, based on the weight of said polyurethane, of higher carboxylic acid selected from the group consisting of myristic acid, palmitic acid, stearic acid and mixtures thereof, said liquid coating material containing from 5 to 20 percent by weight of said polyurethane elastomer;
    2. immersing the coated base material in a liquid coagulating bath selected from the group consisting of water and an aqueous solution of said inorganic salt having a salt concentration of less than two-thirds the concentration of a saturated aqueous solution of said salt, said bath having a temperature in the range of from 5° to 50°C;
    3. and then washing and drying the coagulated material to obtain the microporous sheet material.
2. A method according to claim 1 wherein said liquid coating material contains inorganic salt in an amount in a range of 150 to 400 percent by weight based on the weight of the polyurethane.

3. A method according to claim 1 wherein said inorganic salt is sodium chloride or sodium sulphate and said aliphatic carboxylic acid is stearic acid.

4. A method according to claim 1 wherein said aqueous solution of the inorganic salt, as a coagulating bath, has a concentration of not more than one-third of the concentration of a saturated aqueous solution of said salt.

5. A method according to claim 1 wherein the temperature of the coagulating bath is in a range of 20° to 40°C.

6. A method according to claim 1 wherein the inorganic salt in the coating solution is the same as that in the coagulating bath.

7. A method according to claim 1 wherein said polymer consists essentially of a polyester polyurethane elastomer.

8. A method according to claim 6 wherein the inorganic salt is sodium chloride.

* * * * *